United States Patent
Shekleton et al.

[11] Patent Number: 5,927,066
[45] Date of Patent: Jul. 27, 1999

[54] TURBINE INCLUDING A STORED ENERGY COMBUSTOR

[75] Inventors: Jack R. Shekleton; Colin Rodgers, both of San Diego, Calif.

[73] Assignee: Sundstrand Corporation, Rockford, Ill.

[21] Appl. No.: 07/981,154

[22] Filed: Nov. 24, 1992

[51] Int. Cl.[6] .................................................. F23R 3/04
[52] U.S. Cl. .............................................. 60/39.36; 60/760
[58] Field of Search .................................. 60/39.36, 760, 60/751, 39.11

[56] References Cited

U.S. PATENT DOCUMENTS

| | | | |
|---|---|---|---|
| 4,113,425 | 9/1978 | Von Linde et al. | 60/750 |
| 4,129,985 | 12/1978 | Kajita et al. | 60/760 |
| 4,343,147 | 8/1982 | Shekleton | 60/39.06 |
| 4,343,148 | 8/1982 | Shekleton | 60/39.06 |
| 4,362,500 | 12/1982 | Eriksson et al. | 60/760 |
| 4,478,045 | 10/1984 | Shekleton | 60/737 |
| 4,704,869 | 11/1987 | Iizuka et al. | 60/751 |
| 4,825,640 | 5/1989 | Shekleton | 60/39.36 |
| 4,916,893 | 4/1990 | Rodgers | 60/39.07 |
| 4,926,630 | 5/1990 | Shekleton | 60/39.36 |
| 4,944,152 | 7/1990 | Shekleton | 60/39.36 |
| 4,949,545 | 8/1990 | Shekleton | 60/756 |
| 5,009,589 | 4/1991 | Shekleton et al. | 431/183 |
| 5,033,263 | 7/1991 | Shekleton et al. | 60/39.32 |
| 5,060,469 | 10/1991 | Klaass et al. | 60/39.03 |
| 5,076,061 | 12/1991 | Shekleton et al. | 60/748 |
| 5,131,221 | 7/1992 | Shekleton | 60/760 |
| 5,163,284 | 11/1992 | Shekleton | 60/39.36 |
| 5,187,932 | 2/1993 | Shekleton | 60/760 |
| 5,205,117 | 4/1993 | Shekleton et al. | 60/39.36 |

*Primary Examiner*—Louis J. Casaregola
*Attorney, Agent, or Firm*—Lawrence E. Crowe

[57] ABSTRACT

In a gas turbine engine having gaseous oxidant delivered to a turbine from a source such as a pressurized bottle via a conduit or duct, a compact annular combustor is provided which offers enhanced performance through incorporation of means for uniformly distributing portions of the oxidant utilized as a diluent, and for convective cooling of engine components.

13 Claims, 2 Drawing Sheets

TURBINE INCLUDING A STORED ENERGY COMBUSTOR

FIELD OF THE INVENTION

This invention relates to gas turbine engines, and more particularly to a compact annular combustor which provides enhanced performance in gas turbine engines having gaseous oxidant delivered to the gas turbine engine via a conduit or duct from a source such as a pressurized bottle.

BACKGROUND OF THE INVENTION

In a typical gas turbine engine supplying mechanical output through a rotating shaft connected to a driven device, a compressor wheel ingests and compresses an oxidant, such as ambient air, which is then mixed with atomized fuel and burned in a combustor to produce hot gases of combustion. The hot gases of combustion are then directed at and contained against a turbine wheel by an annular nozzle and an annular shroud, respectively, to cause rotation of the turbine wheel which is operatively connected to drive the rotating shaft.

It is well known that, in order to maximize fuel efficiency and power output from such a gas turbine engine, the engine should be operated with a combustion temperature and a turbine inlet temperature which are as high as possible. As a practical matter, however, the maximum temperatures which may be utilized are determined by the ability of materials used in fabricating components of the engine, such as the combustor, turbine wheel, nozzle, and shroud, to withstand extended exposure to elevated temperatures.

While it is not possible to completely overcome the limitations on combustion and turbine inlet temperatures which are imposed by the materials, it is well known in the art that an acceptable balance between power output, reliability, and life of the engine may be achieved by utilizing a relatively high combustion temperature and providing means within the engine for utilizing a portion of the compressed oxidant either as a diluent injected just upstream of the nozzle for reducing the temperature of the hot gases, or for convectively cooling engine components exposed to the hot gases.

Examples of such means for utilizing the compressed oxidant as a diluent or for convective cooling are disclosed in U.S. Pat. Nos. 4,825,640, 4,926,630, 4,944,152, 4,949,545, and 5,033,263. In each of these patents, the compressed oxidant exits the compressor wheel through an annular outlet which is connected in fluid communication with an annular inlet to an annular combustor. The combustor includes a liner which defines an annular combustion chamber having an annular outlet in fluid communication with the nozzle. The combustor further includes a housing which is spaced from and surrounds the liner such that a plenum chamber having an annular inlet in fluid communication with the inlet to the combustor and an outlet in fluid communication with the combustion chamber is formed between the liner and the housing. Compressed oxidant flowing within the plenum is utilized to provide convective cooling of the shroud and the liner, thereby allowing the use of a high combustion temperature. A portion of the compressed oxidant is also injected into the combustion chamber to dilute, and thus lower the temperature of, the hot gas just upstream from the nozzle such that, although a high combustion temperature is utilized to enhance combustion, the turbine wheel and the shroud are exposed to a somewhat lower inlet temperature which is conducive to achieving improved reliability and longer engine life.

In gas turbine engines such as those cited above, wherein the compressed oxidant is supplied by a compressor wheel and flows through the engine in a relatively uniformly shaped annular flowpath, the implementation of means for utilizing the compressed oxidant as a diluent or for convective cooling is relatively straightforward and easily accomplished. There are applications, however, such as in an auxiliary power unit (APU) or an emergency power unit (EPU) for an aircraft, where it is desirable to utilize a gas turbine engine in which the compressor wheel is replaced by a source of gaseous compressed oxidant such as a pressure bottle, and the compressed oxidant, which may be compressed air or oxygen, is fed directly to the combustor via a conduit or duct.

In these applications, which are referred to hereinafter as stored energy power units, implementation of means for utilizing the compressed oxidant as a diluent or for convective cooling are made considerably more difficult by virtue of the fact that the flowpath is neither uniform nor inherently annular and typically requires that a relatively abrupt transition be made between a small diameter cylindrically shaped conduit or duct and a relatively larger diameter annular shaped nozzle.

In the past, two basic design approaches have been utilized for stored energy power units. In the first, a so-called "can" combustor is incorporated into the conduit or duct which supplies the compressed oxidant, and a housing, which functions as a transition duct, is incorporated into the flowpath between the can combustor and the nozzle to guide the hot gases from the can combustor to the nozzle. Examples of various embodiments utilizing this approach are disclosed in U.S. Pat. Nos. 4,343,147, 4,343,148, 4,478,045, 5,009,589, and 5,076,061.

This approach has several major drawbacks. First, the nozzle, shroud, and turbine wheel are not accessible for convective cooling by the compressed oxidant but are directly exposed to the hot gases of combustion, thereby resulting in the necessity for operating the engine with a hot gas temperature below the maximum temperature limits of the materials. Secondly, due to the relatively abrupt expansion of the flowpath which occurs as the hot gases enter the housing from the combustor, it is very difficult to obtain a uniform flow of hot gases along the housing and the shroud to provide convective cooling. This non-uniformity in the flow can lead to the creation of hot and cold spots on the housing and shroud which may in turn cause cracking or burnout to occur. Thirdly, the can combustor protrudes outward from the housing making packaging difficult and requiring excessive volume.

In the second approach, as illustrated by U.S. Pat. Nos. 4,916,893, and 5,060,469, an annular stored energy combustor, similar to the annular combustors described above for U.S. Pat. No. 4,825,640, is utilized. The annular stored energy combustor typically includes a liner defining an annular combustion chamber having an outlet in fluid communication with the nozzle and a housing surrounding and spaced outward from the liner to form a plenum chamber in fluid communication with an oxidant inlet duct. Utilization of such an annular stored energy combustor results in a stored energy power unit which is more compact than a stored energy power unit which uses a can combustor by virtue of the fact that the combustor is contained entirely within the envelope required for the housing. Utilization of the annular stored energy combustor also allows a portion of the compressed oxidant to be used either as a diluent for reducing the temperature of the hot gases or for convectively cooling the engine components, thereby allowing higher combustion temperatures and hence higher power output than is achievable in stored energy power units utilizing can combustors. The problem of maldistribution of the compressed oxidant, resulting from the abrupt transition between the oxidant inlet duct and the nozzle, leading to hot and cold spots which negatively affect reliability and life of the stored energy power unit remain, however, since means for uniformly distributing oxidant flowing from the oxidant inlet duct into the plenum chamber are not provided.

What is needed, therefore, is an improved combustor which includes means for dealing with the abrupt transition in the flowpath which occurs between the conduit or duct and the nozzle, and for providing a uniformly distributed flow of compressed oxidant for use in convective cooling of components in a gas turbine engine receiving gaseous compressed oxidant via a conduit or duct.

SUMMARY OF THE INVENTION

Accordingly, the principle objective is to provide a new and improved gas turbine for use in applications where gaseous compressed oxidant is delivered to the engine via a duct or conduit from a source such as a pressurized bottle. A further objective is to provide such an improved gas turbine engine in a lightweight package which is compact enough for use in densely packed envelopes typical of applications utilizing a gas turbine engine in an auxiliary power unit (APU) or an emergency power unit (EPU) for an aircraft.

An exemplary embodiment of the instant invention achieves the foregoing objectives in a gas turbine engine, including a turbine wheel rotatable about an axis, a nozzle for directing gases at the turbine wheel to cause rotation of the turbine wheel, and an annular combustor disposed about the axis.

The combustor includes a liner connected to the nozzle, with the liner defining an annular combustion chamber having an outlet in fluid communication with the nozzle. The combustor further includes a housing spaced outward from and substantially surrounding the liner to form a plenum chamber between the liner and the housing through which compressed oxidant may be circulated about the liner.

The housing includes an oxidant inlet duct in fluid communication with the plenum chamber and means for distributing compressed oxidant delivered to the plenum chamber by the oxidant inlet duct substantially uniformly about the liner.

According to a preferred embodiment of the instant invention, the oxidant inlet is directed generally tangentially to the plenum chamber, and a flow distributing screen is incorporated within the plenum chamber between the oxidant inlet duct and the liner such that compressed oxidant delivered to the plenum chamber by the oxidant inlet duct is caused to flow about the liner in a substantially uniformly distributed, circumferentially rotating manner. The plenum chamber is also progressively reduced in cross-sectional area downstream of the oxidant inlet duct to facilitate uniform flow distribution.

As a consequence of this construction, the compressed oxidant flowing uniformly about the liner provides uniform convective cooling of the liner and the housing, thereby allowing the gas turbine engine to be operated at higher turbine inlet temperatures, conducive to increased performance, without fear of adversely affecting reliability or life of engine components due to thermal stresses from hot or cold spots or as a result of exceeding material allowables.

In a highly preferred embodiment of the instant invention, the combustion chamber further includes a primary combustion annulus opposite the outlet of the combustion chamber, a dilution annulus adjacent the outlet, a secondary combustion annulus between the primary combustion annulus and the dilution annulus, and the oxidant inlet duct is further positioned at an end of the housing opposite the outlet of the combustion chamber. Compressed oxidant from the plenum chamber is admitted to the primary and secondary combustion annuli and to the dilution annulus by openings in the liner positioned within each of the combustion and dilution annuli. As a consequence of this arrangement, at least a portion of the compressed oxidant issuing into the plenum chamber from the oxidant inlet duct flows along and provides cooling for virtually the entire liner prior to entering the combustion chamber in the dilution annulus via the openings in the liner. Compressed oxidant entering the dilution annulus serves to reduce the temperature of the hot gas just upstream of the nozzle, thereby allowing the use of higher combustion chamber temperatures while maintaining the turbine inlet temperature within acceptable limits for materials used in constructing the turbine wheel and the nozzle.

Other advantages and advancements in the state of the art provided by the gas turbine engine of the instant invention will become apparent from the following specification, taken in connection with the accompanying drawings.

DESCRIPTION OF THE PREFERRED EMBODIMENT

Figure 1:
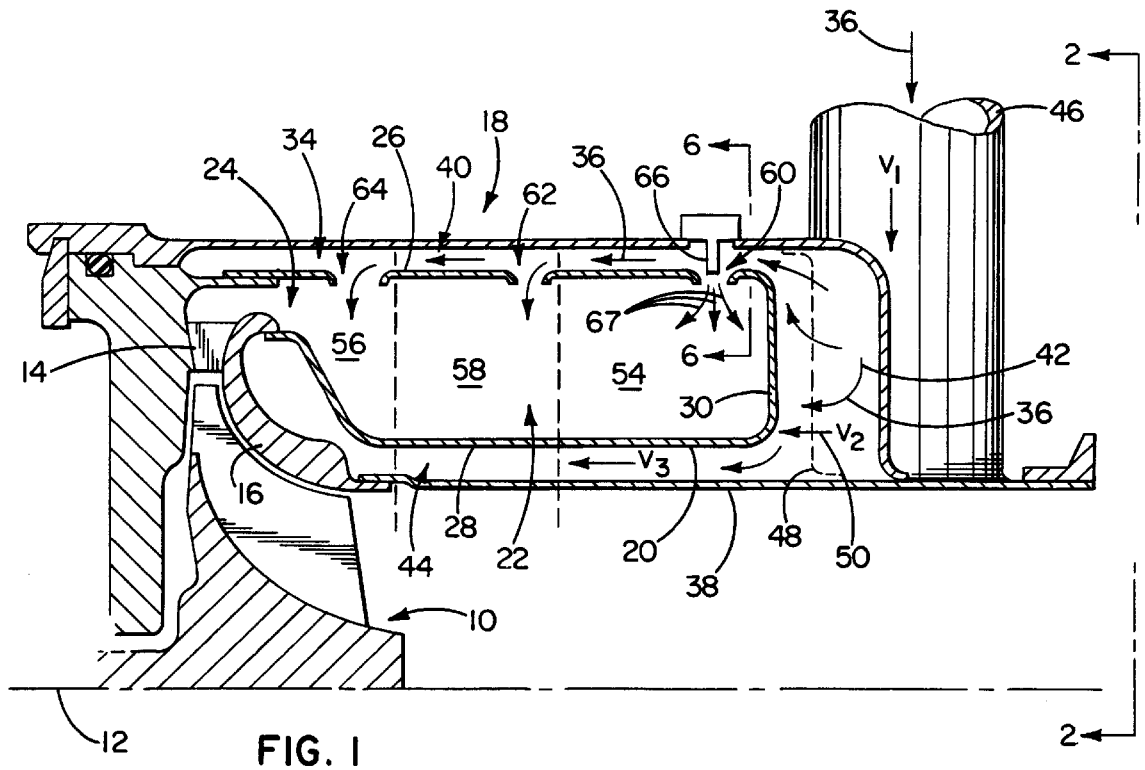
FIG. 1 is a partially schematic, fragmentary sectional view of a gas turbine engine including a stored energy combustor according to the instant invention.

Referring now to the drawings wherein like numerals indicate like elements, FIG. 1 illustrates a preferred embodiment of a gas turbine engine employing the instant invention which includes a turbine wheel 10 rotatable about an axis 12, a nozzle 14, and a shroud 16 which respectively direct gases at and contain gases against the turbine wheel 10 to cause rotation of the turbine wheel 10. An annular combustor, generally designated 18, is disposed about the axis 12 and has an oxidant inlet duct 46 in fluid communication with a source of compressed oxidant (not shown).

The combustor 18 includes a liner 20 defining an annular combustion chamber 22 having an outlet 24 in fluid communication with the nozzle 14. The liner 20 includes a generally cylindrical, axially extending, radially outer wall 26, an axially extending radially inner wall 28, and a radially extending end wall 30 connecting the radially inner and outer walls 26, 28 opposite the outlet 24 of the combustion chamber 22.

The combustor 18 further includes a housing 32 spaced outward from and substantially surrounding the liner 20 to form a plenum chamber, generally designated 34, which is connected in fluid communication with the oxidant inlet duct 46 such that compressed oxidant, indicated by arrows 36, entering the plenum chamber 34 from the oxidant inlet duct 46 may be circulated about the liner 20 to provide convective cooling of the liner 20 and the shroud 16. The plenum chamber 34 includes an axially elongated outer annulus 40 between the radially outer wall 26 of the liner 20 and the housing 32 and a radially extending annulus 42 between the end wall 30 of the liner 20 and the housing 32 with the radially extending annulus 42 connected in fluid communication with the axially extending outer annulus 40. The housing 32 further includes a central sleeve 38 spaced radially inward from the radially inner wall 28 and connected to a radially inner end 17 of the shroud 16 to define an axially extending inner annulus 44 in fluid communication with the radially extending annulus 42.

The combustor 18 of the preferred embodiment also includes several exemplary embodiments of means for distributing compressed oxidant substantially uniformly about the liner 20 and along the shroud 16 to provide uniform convective cooling, thereby eliminating hot and cold spots.

Figure 2:
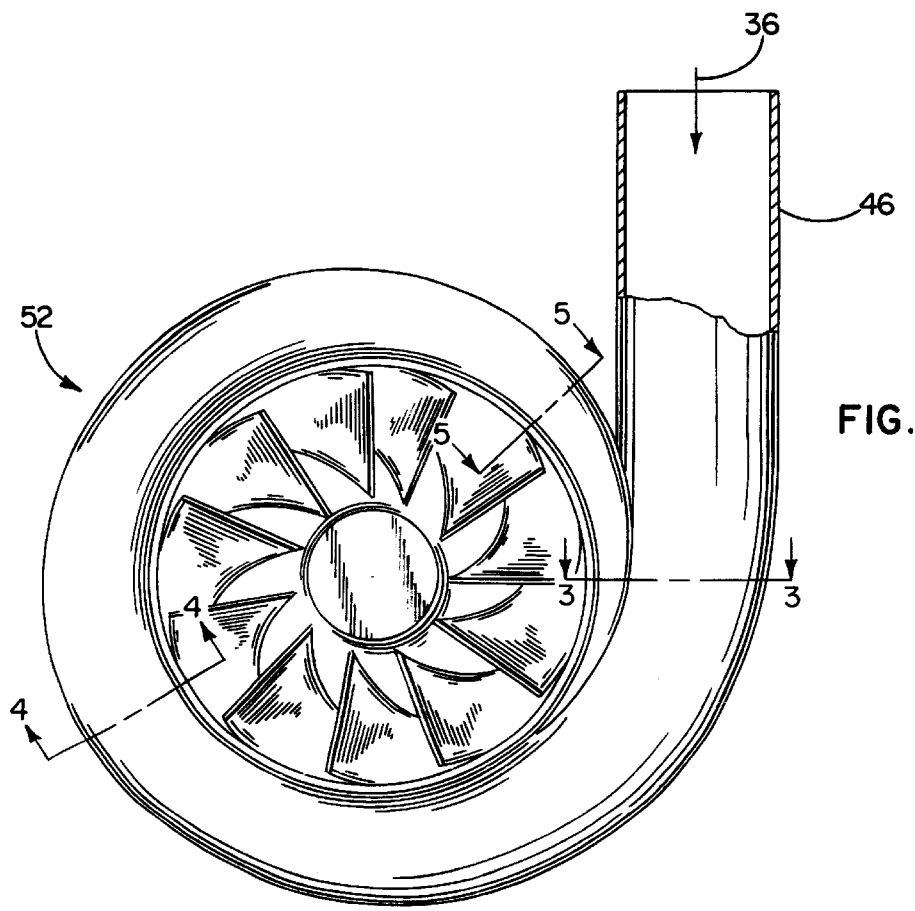
FIG. 2 is an end view of the gas turbine engine of FIG. 1.
Figure 3:
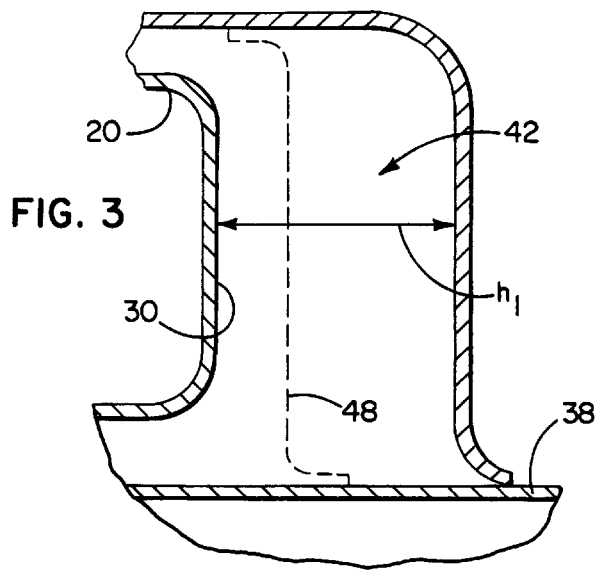
FIGS. 3, 4, and 5 are partial, cross-sectional views illustrating features of the plenum chamber of the preferred embodiment of the instant invention.
Figure 4:
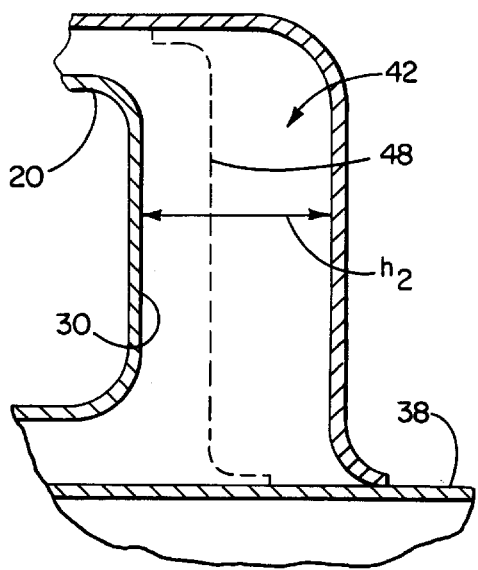
Figure 5:
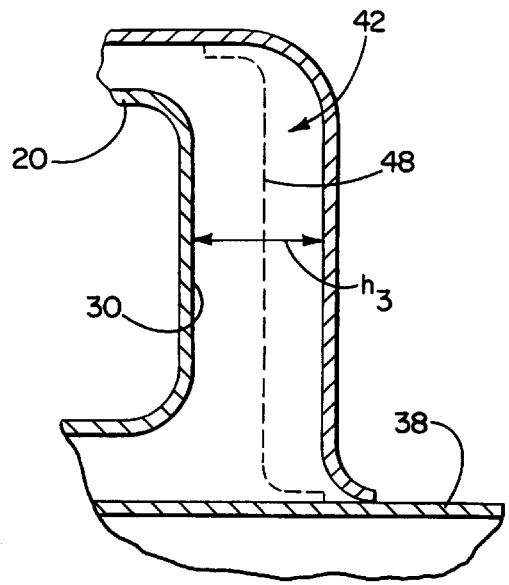

Referring now to FIGS. 1 and 2, it will be seen that one such means for distributing is provided by directing the oxidant inlet duct 46 generally tangentially to the outer annulus 40 of the plenum chamber 34, preferably in a direction matching the rotation of the turbine wheel 10, such that compressed oxidant delivered to the plenum chamber 34 by the oxidant inlet duct 46 is caused to flow about the liner 20 and along the shroud 16 in a substantially circumferentially rotating manner highly conducive to convective cooling of the liner 20 and shroud 16. In the preferred embodiment of the instant invention, the oxidant inlet duct 46 enters the plenum chamber 34, in a tangential fashion, as previously described, within the radially extending annulus 42, to create a rotating mass of compressed oxidant which supplies compressed oxidant in a relatively circumferentially uniform manner to the inner and outer 44, 40 annuli of the plenum chamber 34.

Another such means for distributing, also best seen in FIGS. 1 and 2, is provided by incorporating a flow distributing screen 48 between the oxidant inlet duct 46 and the liner 20, with the screen 48 having openings 50 for the passage of the compressed oxidant 36 which are sufficiently small such that, in order to pass through the screen 48, the compressed oxidant must accelerate to a velocity $V_2$ which is greater than a velocity of flow $V_1$ or $V_3$ present in the oxidant inlet duct 46 or the plenum chamber 34, respectively. In the preferred embodiment of the instant invention, the screen 48 is radially extending, and located within the radially extending annulus 42 between the oxidant inlet duct 46 and the end wall 30 of the liner 20 such that the compressed oxidant flowing into the radially extending annulus 42 is caused to flow in a substantially uniform manner through the screen 48 in order to enter the inner and outer annuli 44, 40 of the plenum chamber 34.

Yet another such means for distributing compressed oxidant substantially uniformly about the liner 20 and along the shroud 16 to provide uniform convective cooling and elimination of hot and cold spots is provided in the preferred embodiment by progressively reducing the radially extending annulus 42 in cross-sectional area, as best seen in FIGS. 2–5, downstream of the oxidant inlet duct 46 to form an inlet scroll, generally designated 52, which serves to smooth the abrupt transition (not shown) from the oxidant inlet duct 46 to the plenum chamber 34. In the preferred embodiment, this reduction in cross-sectional area is accomplished by progressively reducing the radially extending annulus 42 in axial length as shown in FIGS. 2–5, wherein an axial dimension $h_1$, located just downstream from the oxidant inlet duct 46, is reduced in length to an axial dimension $h_2$ which is less than $h_1$, at a point in the radially extending plenum, located generally diametrically opposite the oxidant inlet duct 46, and yet further reduced in length to an axial dimension $h_3$ which is less than $h_2$ at a point adjacent the oxidant inlet duct 46.

The combustor 18 also includes means for utilizing a portion of the compressed oxidant as a diluent which complement and enhance the effectiveness of the previously described means for distributing the compressed oxidant used for convective cooling. Specifically, as indicated by dashed lines in FIG. 1, the combustor 18 includes within the combustion chamber 22 a primary combustion annulus 54 located opposite the outlet 24 of the combustion chamber 22, a dilution annulus 56 adjacent the outlet 24, and a secondary combustion annulus 58 between the primary combustion annulus 54 and the dilution annulus 56. Within each of the combustion and dilution annuli 54, 56, 58, a plurality of apertures, designated as primary oxidant inlets 60 within the primary combustion annulus 54, secondary oxidant inlets 62 within the secondary combustion annulus 58, and as tertiary oxidant inlets 64 within the dilution annulus 56, provide fluid communication between the plenum chamber 34 and the combustion chamber 22.

The combustor 18 also includes, within the primary combustion annulus 54, a plurality of fuel injectors 66 for injecting atomized fuel, as indicated by arrows 67, into the combustion chamber 22 with the fuel injectors preferably being spaced equally, angularly around the primary combustion annulus 54 and configured to direct the fuel 67 into the primary combustion annulus in a nominally tangential direction. As shown in FIG. 1, the fuel injectors may be located within the primary oxidant inlets 60 to promote efficient mixing of the atomized fuel 67 and the compressed oxidant entering the combustion chamber 22 through the primary oxidant inlets 60.

Figure 6:
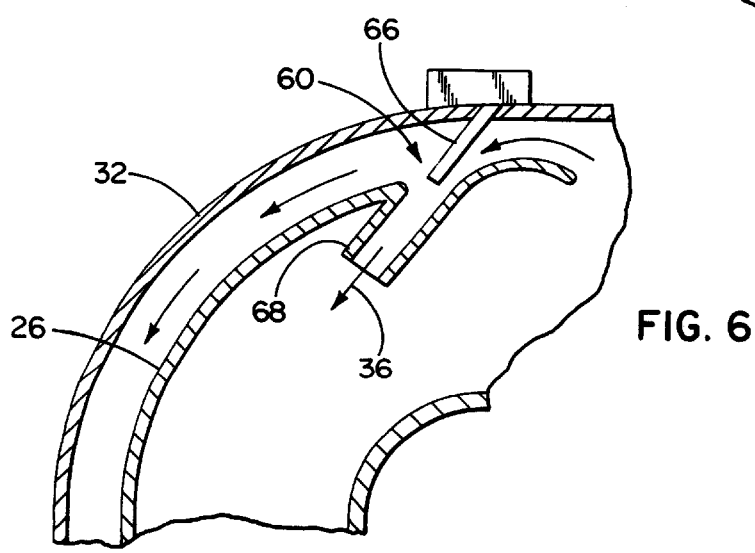
FIG. 6 is a cutaway, sectional view illustrating inlet tubes for directing the flow of compressed oxidant within the combustion chamber of the preferred embodiment.

In the preferred embodiment, the oxidant inlets 54, 56, 58 extend through the radially outer wall 26 of the liner 20 and are spaced substantially equally, angularly therearound such that compressed oxidant within the plenum chamber 34 will tend to flow about the liner 20 in a uniformly distributed fashion prior to entering the oxidant inlets 54, 56, 58. As shown in FIG. 6, inlet tubes 68 may be attached to the liner 20 about the oxidant inlets 60, 62, 64 to direct the compressed oxidant entering the combustion chamber 22 either in a direction conducive to providing convective cooling or tangentially to promote a pattern of circumferentially rotating flow within the combustion chamber 22 which is conducive to thorough mixing of the oxidant with the atomized fuel 67 or with the hot gases of combustion.

It will be appreciated that, through the incorporation of the oxidant inlets 60, 62, 64, the primary and secondary combustion, and the dilution annuli 54, 58, 56, in the manner described, a combustion temperature may be utilized within the primary combustion annulus which is substantially higher than the maximum temperature allowable due to temperature limitations imposed by materials at the nozzle 14 or the turbine 10.

It will further be appreciated that, by strategically locating, with regard to each other and with regard to the oxidant inlet, the oxidant inlets 60, 62, 64, the primary and secondary combustion, and the dilution annuli 54, 58, 56, according to the instant invention, compressed oxidant is progressively admitted to the combustion chamber 22 via the oxidant inlets 60, 62, 64 in a controlled manner such that the compressed oxidant is caused to remain in the plenum chamber 34 circulating about the liner 10 and along the shroud 16 for as long as possible to provide convective cooling prior to being admitted into the combustion chamber 22. Specifically, the compressed oxidant entering the plenum chamber 34 from the oxidant inlet duct 46 within the radially extending annulus 42 is caused to flow in a circumferentially rotating manner along the liner 20 with only such compressed oxidant as is required for efficient combustion being admitted to the combustion chamber 22 by the primary oxidant inlets 60, and the remainder of the compressed oxidant continuing to be utilized for convective cooling along the axial length of the liner 20 prior to being admitted to the combustion chamber 22 by the secondary and tertiary oxidant inlets 62, 64. With this arrangement, at least a portion of the compressed oxidant entering the combustor 18 via the oxidant inlet duct 46 is required to flow in a uniformly distributed manner along virtually the entire axial length of the liner 20 and along the shroud 16 prior to entering the combustion chamber 22 as a diluent via the tertiary oxidant inlets 64. It should also be appreciated that, with the oxidant inlet duct located within the radially extending annulus 42 and adjacent the primary combustion annulus 54, the hottest portion of the liner 20 is exposed to the coolest compressed oxidant, essentially creating a counter-flow arrangement conducive to optimum heat exchanging effectiveness.

From the foregoing description, it will be obvious to one skilled in the art that, through the incorporation of means for distributing compressed oxidant in a uniform manner, and means for utilizing a portion of the compressed oxidant as a diluent in an annular combustor, according to the instant invention, an improved gas turbine of compact size has been provided for use in applications where gaseous compressed oxidant is delivered to the engine via a duct or a conduit from a source such as a pressurized bottle.

Specifically, utilization of the annular combustor 18, according to the instant invention, eliminates packaging problems due to protruding combustors encountered in prior art gas turbine engines using can combustors. The combustor 18 of the instant invention also allows relatively cool compressed oxidant to be utilized for convective cooling of the housing 32 and shroud 16, in contrast to can combustors in which hot gases of combustion must be utilized, thereby allowing operation of the engine of the instant invention at higher temperatures for improved power output and efficiency without negative impact on reliability and life.

Through incorporation into the instant invention of means for distributing the compressed oxidant in a uniform manner such as the strategic location and direction of the oxidant inlet duct 46, the flow distributing screen 48, the inlet scroll 52, and the configuration of the plenum and combustion chambers 34, 22, described herein, problems such as hot and cold spots encountered in prior art gas turbine engines utilizing both can-type and annular combustors due to poorly distributed flow of gases used for convective cooling resulting from abrupt transitions between the conduit or duct supplying compressed oxidant and the housing are eliminated.

Incorporation into the instant invention of means for effectively utilizing a portion of the compressed oxidant as a diluent, such as the primary, secondary, and tertiary oxidant inlets 60, 62, 64, which respectively allow for controlled injection of the compressed oxidant into the primary and secondary combustion annuli 54, 58 and the dilution annulus 56, offer further improvement over the prior art by providing means for overcoming limitations on operating temperatures imposed by materials which limited the power output, efficiency, reliability, and life of prior gas turbine engines having compressed oxidant delivered to the engine via a conduit or duct from a source such as a pressurized bottle.

Although this invention has been illustrated and described in conjunction with particular embodiments thereof, it will be apparent to those skilled in the art that other combinations, modifications, and uses of the various features of the instant invention may be devised without departing from the spirit of the invention as set forth in the appended claims.

We claim:

1. A gas turbine engine comprising:
   a turbine wheel rotatable in a direction of rotation about an axis;
   an annular nozzle for directing gases at said turbine wheel to cause rotation of the turbine wheel in said direction of rotation;
   an annular shroud disposed about said axis in close radial proximity to said turbine wheel for containing gases directed at the turbine wheel by the nozzle against said turbine wheel;
   an annular combustor disposed about said axis, with said combustor including:
      a liner defining an annular combustion chamber having at least one inlet port for receiving oxidant and an annular outlet in fluid communication with the nozzle;
      a housing connected to the shroud, said housing being spaced outward from said liner, with said shroud and housing in combination substantially surrounding said liner and defining an oxidant flowpath including an oxidant inlet duct in fluid communication with a source of compressed oxidant supplying a predetermined flow of oxidant at one end thereof, and an oxidant outlet in communication with said inlet port of said annular combustor at the other end thereof, said oxidant flowpath extending substantially entirely about said annular combustor and along said shroud so as to form a first flowpath branch about the radially outermost wall of said liner and a second flowpath branch about the radially innermost wall of said liner, said first and second flowpath branches being joined adjacent said inlet duct;
      a screen disposed in said oxidant flowpath at a point along said flowpath between said inlet duct of the housing and the junction of said first and second flowpath branches, said screen having openings therein of a size selected to restrict said predetermined flow of oxidant within the flowpath in a manner causing the predetermined flow of oxidant to be distributed evenly between said first and second flowpath branches about said liner and along said shroud to provide cooling therefor.

2. The gas turbine engine of claim 1 further including a plurality of oxidant inlets ports defined by said liner, with said plurality of oxidant inlet ports providing fluid communication between the oxidant flowpath and the combustion chamber;
   said oxidant inlets spaced substantially equally, angularly around the liner in three (3) transverse planes with said first transverse plane being located within a primary combustion annulus of the combustion chamber opposite the annular outlet, the second transverse plane being located within a dilution annulus of the combustion chamber adjacent the annular outlet, and the third transverse plane being located within a secondary combustion annulus of the combustion chamber disposed between the primary combustion and dilution annuli.

3. The gas turbine engine of claim 2 further including inlet tubes about the oxidant inlets and extending into the combustion chamber for directing the flow of compressed oxidant.

4. The gas turbine engine of claim 1 wherein said inlet tubes are similarly directed generally tangentially to the radially outer wall of the liner.

5. The gas turbine engine of claim 3 wherein the combustor further includes a plurality of fuel injectors attached within inlet tubes in the primary combustion annulus, said fuel injectors being configured to direct fuel into the primary combustion annulus in a direction nominally matching the generally tangential direction of the inlet tubes.

6. The gas turbine engine of claim 2 wherein the combustor further includes a plurality of fuel injectors attached to the liner within the primary combustion annulus, said fuel injectors being substantially equally, angularly spaced therearound and configured to direct fuel into the primary combustion annulus in a direction substantially tangential to the outer wall of the liner.

7. The gas turbine engine of claim 1 wherein the oxidant inlet duct is oriented to direct compressed oxidant entering the combustor through the oxidant inlet duct in a direction generally tangential to the housing and in a direction generally matching the direction of rotation of the turbine wheel.

8. In an emergency power unit having a gas turbine engine receiving oxidant via a conduit from a source of compressed oxidant, that gas turbine engine including:
a turbine wheel rotatable in a direction of rotation about an axis;
an annular nozzle for directing gases at said turbine wheel to cause rotation of the turbine wheel in said direction of rotation;
an annular shroud disposed about said axis in close radial proximity to said turbine wheel for containing gases directed at the turbine wheel by the nozzle against said turbine wheel; and
an annular combustor disposed about said axis, with said combustor including:
a liner defining an annular combustion chamber having at least one inlet port for receiving oxidant and an annular outlet in fluid communication with the nozzle;
a housing connected to the shroud, said housing being spaced outward from said liner, with said shroud and housing in combination substantially surrounding said liner and defining an oxidant flowpath including an oxidant inlet duct connected in fluid communication via said conduit to said source of compressed oxidant to receive therefrom a predetermined flow of oxidant at one end of said flowpath and further including at the other end thereof an oxidant outlet in communication with said inlet port of said annular combustor, said oxidant flowpath extending substantially entirely about said annular combustor and along said shroud so as to form a first flowpath branch about the radially outermost wall of said liner and a second flowpath branch about the radially innermost wall of said liner, said first and second flowpath branches being joined adjacent said inlet duct;
a screen disposed in said oxidant flowpath at a point along said flowpath between said inlet duct of the housing and the junction of said first and second flowpath branches, said screen having openings therein of a size selected to restrict said predetermined flow of oxidant within the flowpath in a manner causing the predetermined flow of oxidant to be distributed evenly between said first and second flowpath branches about said liner and along said shroud to provide cooling therefor.

9. The gas turbine engine of claim 8 wherein:
said oxidant inlet duct includes a cross sectional flow area defining a first velocity of oxidant within the oxidant inlet duct when supplying the predetermined flow of oxidant; and
said openings in said screen have a size selected to cause said predetermined flow of oxidant within said flowpath to accelerate to a second velocity of oxidant within said openings of the screen,
said so velocity of oxidant within the openings in the screen being greater than said first velocity of oxidant through the oxidant inlet duct.

10. A gas turbine engine comprising:
a turbine wheel rotatable in a direction of rotation about an axis;
an annular nozzle for directing gases at said turbine wheel to cause rotation of the turbine wheel in said direction of rotation;
an annular shroud disposed about said axis in close radial proximity to said turbine wheel for containing gases directed at the turbine wheel by the nozzle against said turbine wheel; and
an annular combustor disposed about said axis, with said combustor including:
a liner defining an annular combustion chamber having at least one inlet port for receiving oxidant and an annular outlet in fluid communication with the nozzle;
a housing connected to the shroud, said housing being spaced outward from said liner, with said shroud and housing in combination substantially surrounding said liner and defining an oxidant flowpath including an oxidant inlet duct in fluid communication with a source of compressed oxidant supplying a predetermined flow of oxidant at one end thereof, and an oxidant outlet in communication with said inlet port of said annular combustor at the other end thereof, said oxidant flowpath extending substantially entirely about said annular combustor and along said shroud, so as to form a first flowpath branch about the radially outermost wall of said liner and a second flowpath branch about the radially outermost wall of said liner, said first and second flowpath branches being joined adjacent said inlet duct with said oxidant inlet duct having a cross sectional area defining a first velocity of oxidant within the oxidant inlet duct when supplying the predetermined flow of oxidant;
a screen disposed in said oxidant flow point at a point along said flowpath between said inlet duct of the housing and the, junction of said first and second flow branches,
said screen having openings therein of a size selected to cause said predetermined flow of oxidant within the flowpath to accelerate to a second velocity within said openings of the screen greater than the first velocity within the inlet duct,
said screen thereby providing means for restricting said predetermined flow of oxidant through the flowpath in a manner causing the predetermined flow of oxidant to be distributed evenly between said first and second flowpath branches about said liner and along said shroud to provide cooling therefor.

11. A gas turbine engine comprising:
a turbine wheel rotatable in a direction of rotation about an axis;
an annular nozzle for directing gases at said turbine wheel to cause rotation of the turbine wheel in said direction of rotation;
an annular shroud disposed about said axis in close radial proximity to said turbine wheel for containing gases directed at the turbine wheel by the nozzle against said turbine wheel; and
an annular combustor disposed about said axis, with said combustor including:
a liner defining an annular combustion chamber having at least one inlet port for receiving oxidant and an annular outlet in fluid communication with the nozzle;
a housing connected to the shroud, said housing being spaced outward from said liner, with said shroud end housing in combination substantially surrounding said liner and defining an oxidant flowpath including an oxidant inlet duct in fluid communication with a source of compressed oxidant supplying a predetermined flow of oxidant at one end thereof, and an oxidant outlet in communication with said inlet port of said annular combustor at the other end thereof, said oxidant flowpath extending substantially entirely about said annular combustor and along said shroud;
a screen disposed in said oxidant flowpath at a point along said flowpath between said inlet duct of the housing and said inlet port of the liner, said screen having openings therein of a size selected to restrict said predetermined flow of oxidant within the flowpath in a manner causing the predetermined flow of oxidant to be distributed evenly about said liner and along said shroud to provide cooling therefor;
said liner including a generally cylindrical, axially extending, radially outer wall, an axially extending, radially inner wall, and a radially extending end wall connecting said radially inner and outer walls, with said liner in conjunction with said housing and said shroud defining a plenum chamber in said flowpath about said liner, with said plenum chamber including an axially elongated outer annulus between said radially outer wall of the liner and the housing, an axially extending inner annulus between the radially inner wall of the liner, the housing, and the shroud, in combination, and a radially extending annulus between said end wall of the liner and the housing, with said radially extending annulus providing fluid communication between said axially extending inner and outer annuli; and
said oxidant inlet duct being configured to direct oxidant entering the annular plenum chamber from the inlet duct in a direction generally tangential to the outer wall of the liner and generally transverse to the axis such that oxidant delivered to the plenum chamber by the oxidant inlet duct is caused to flow about the liner and along the shroud in a substantially circumferentially rotating manner.

12. The gas turbine engine of claim 11 wherein said inlet duct is configured to deliver oxidant to said radially extending annulus of said plenum chamber.

13. The gas turbine engine of claim 12 wherein said combustor is configured to define an inlet scroll such that said radially extending annulus has a maximum cross sectional area adjacent said oxidant inlet and is progressively reduced in cross sectional area along a circumferentially directed path extending from said oxidant inlet duct.

* * * * *